(12) United States Patent
Noda

(10) Patent No.: US 11,156,850 B2
(45) Date of Patent: Oct. 26, 2021

(54) OPTICAL MOVE APPARATUS AND OPTICAL APPARATUS

(71) Applicant: CANON KABUSHIKI KAISHA, Tokyo (JP)

(72) Inventor: Atsuto Noda, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/930,898

(22) Filed: May 13, 2020

(65) Prior Publication Data

US 2020/0363647 A1 Nov. 19, 2020

(30) Foreign Application Priority Data

May 16, 2019 (JP) .............................. JP2019-092924

(51) Int. Cl.
  *G02B 27/64* (2006.01)
  *G02B 7/04* (2021.01)
(52) U.S. Cl.
  CPC ............. *G02B 27/646* (2013.01); *G02B 7/04* (2013.01)
(58) Field of Classification Search
  CPC ........ G02B 27/646; G02B 27/64; G02B 7/04; G02B 7/02; G02B 7/00
  USPC ....................................................... 359/557
  See application file for complete search history.

(56) References Cited

U.S. PATENT DOCUMENTS

| 10,429,722 | B2 * | 10/2019 | Rho ................... H04N 5/23287 |
| 2015/0131153 | A1 * | 5/2015 | Wade ................... G02B 27/646 |
| | | | 359/557 |
| 2017/0059880 | A1 * | 3/2017 | Fujinaka .................. G02B 7/08 |
| 2018/0067379 | A1 * | 3/2018 | Rho .......................... G03B 3/10 |
| 2019/0072743 | A1 * | 3/2019 | Shinano ................. G03B 17/14 |
| 2020/0004041 | A1 * | 1/2020 | Matsuhisa .......... H02K 41/0356 |

FOREIGN PATENT DOCUMENTS

JP 2011-028046 A 2/2011

* cited by examiner

*Primary Examiner* — William R Alexander
(74) *Attorney, Agent, or Firm* — Cowan, Liebowitz & Latman, P.C.

(57) ABSTRACT

An optical move apparatus includes a drive magnet held by a holding member and configured to drive the holding member together with a drive coil in first and second directions, a first guide member fixed to the holding member, a second guide member configured to guide the first guide member in the first direction, and a third guide member fixed to the base member and configured to guide the second guide member in the second direction on a side opposite to the first guide member in the optical axis direction. None of the first, second, and third guide members overlap the drive coil in the optical axis direction. The third guide member includes two bodies in a plane orthogonal to the optical axis direction. At least part of the third guide member is thinner than the drive coil in the optical axis direction.

13 Claims, 7 Drawing Sheets

OPTICAL MOVE APPARATUS AND OPTICAL APPARATUS

BACKGROUND OF THE INVENTION

Field of the Invention

The present invention relates to an optical move apparatus that moves s an optical element.

Description of the Related Art

The optical shift apparatus (optical image stabilization apparatus) that reduces (corrects) image blurs by shifting the optical element, such as a lens and an image sensor employs, as disclosed in Japanese Patent Laid-Open No. ("JP") 2011-028046, a rotation restricting structure that allows the optical element to move in two directions orthogonal to the optical axis direction and restricts its rotation. In JP 2011-028046, an actuator that shifts the lens includes a coil provided on a movable side and a magnet provided on a fixed side.

However, it is necessary for the coil disposed on the movable side to dispose a conductor such as a flexible printed circuit board used to flow the current through the coil, in a sufficiently wide space so as to secure the movement of the coil, which causes the optical shift apparatus to be larger.

SUMMARY OF THE INVENTION

The present invention provides a compact optical move apparatus having a rotation restricting structure for an optical element, and an optical apparatus having the same.

An optical move apparatus according to one aspect of the present invention configured to move an optical element in a first direction and a second direction that are orthogonal to an optical axis direction and orthogonal to each other includes a base member, a drive coil held by the base member, a holding member configured to hold the optical element and to move in the first and second directions, a drive magnet held by the holding member and serving as a move actuator configured to drive the holding member together with the drive coil in the first and second directions, a first guide member fixed to the holding member, a second guide member configured to guide the first guide member in the first direction, and a third guide member fixed to the base member and configured to guide the second guide member in the second direction on a side opposite to the first guide member in the optical axis direction. None of the first, second, and third guide members overlap the drive coil in the optical axis direction. The third guide member includes two bodies in a plane orthogonal to the optical axis direction. At least part of the third guide member is thinner than the drive coil in the optical axis direction.

An optical move apparatus according to another aspect of the present invention configured to move an optical element in a first direction and a second direction that are orthogonal to an optical axis direction and orthogonal to each other so as to reduce an image blur includes base member, a drive coil held by the base member, a holding member configured to hold the optical element and to move in the first and second directions, a drive magnet held by the holding member and serving as a move actuator configured to drive the holding member together with the drive coil in the first and second directions, a first guide member fixed to the holding member, a second guide member configured to guide the first guide member in the first direction, and a third guide member fixed to the base member and configured to guide the second guide member in the second direction on a side opposite to the first guide member in the optical axis direction, and a magnetic shield member disposed on a side opposite to the drive magnet with respect to the drive coil in the optical axis direction. None of the first, second, and third guide members overlap the drive coil or the magnetic shield member in the optical axis direction. The third guide member includes two bodies in a plane orthogonal to the optical axis direction. The thickness of at least part of the third guide member is thinner than the magnetic shield member in the optical axis direction.

Further features of the present invention will become apparent from the following description of exemplary embodiments with reference to the attached drawings.

DESCRIPTION OF THE EMBODIMENTS

Figure 1:
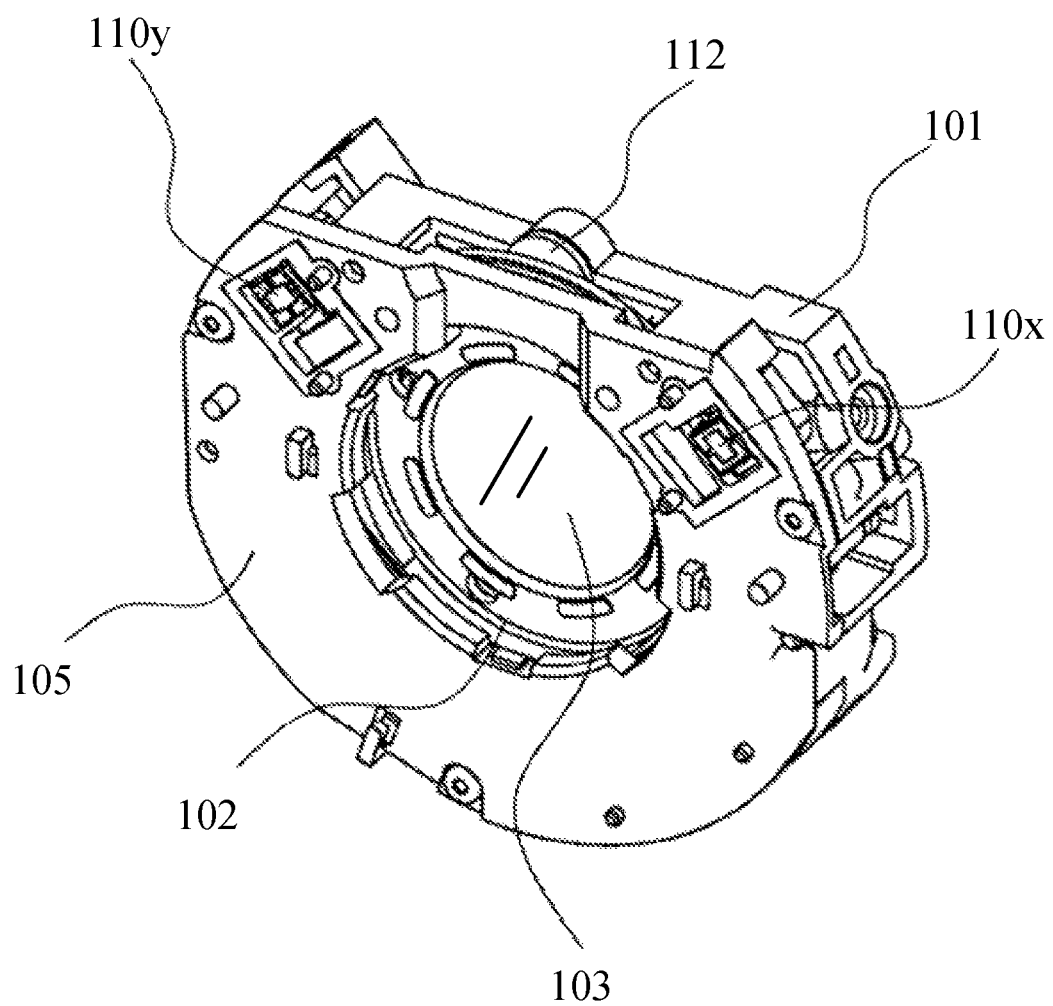
FIG. 1 is a perspective view of an image stabilization unit according to one embodiment of the present invention.
Figure 2:
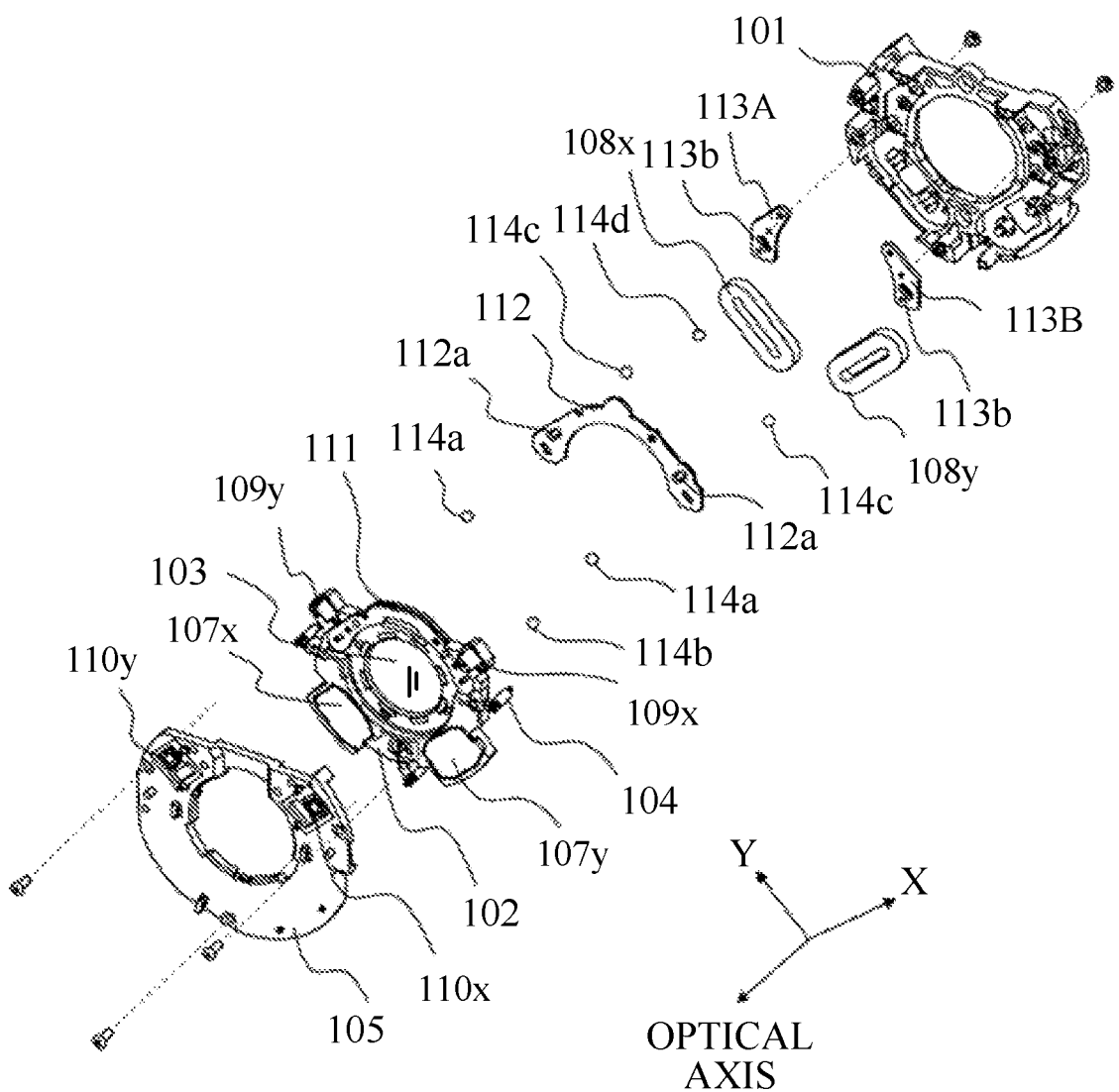
FIG. 2 is an exploded perspective view of the image stabilization unit according to this embodiment.
Figure 3:
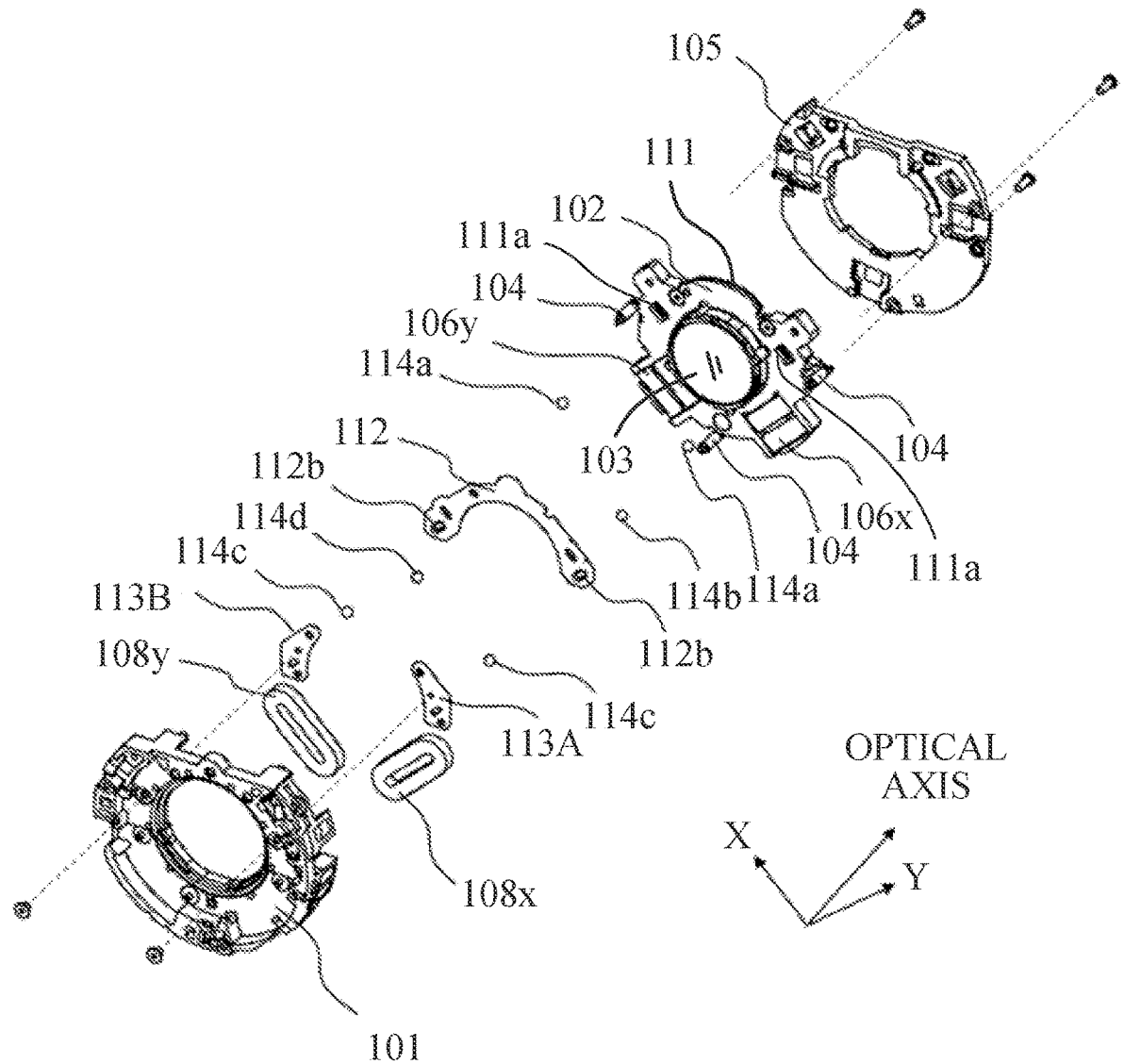
FIG. 3 is another exploded perspective view of the image stabilization unit according to this embodiment.

Referring now to the accompanying drawings, a description will be given of embodiments according to the present invention. FIGS. 1, 2, and 3 illustrate a configuration of an image stabilization unit as an optical shift apparatus (optical move apparatus or optical image stabilization apparatus) according to an embodiment of the present invention. The image stabilizing unit is disposed in an image pickup optical system described later, and reduces (corrects) image blurs in an X direction serving as a first direction and a Y direction serving as a second direction (also collectively referred to as a shift or move direction hereinafter) that are two directions orthogonal to a direction in which the optical axis of the image pickup optical system extends (referred to as an optical axis direction hereinafter) and orthogonal to each other.

The image stabilization unit has a fixed member (base member) 101 serving as its base and a lens holding member 102. The lens holding member 102 holds a correction lens 103 serving as an optical element (image stabilization element), and is supported movably (shiftably) in a shift direction relative to the fixed member 101. Each of three biasing members 104 includes a retraction spring, and biases the lens holding member 102 toward the fixed member 101 in the optical axis direction. A cover 105 is fixed onto the fixed member 101 with a screw so as to sandwich the lens holding member 102 in the optical axis direction. The cover 105 may be fixed by a method other than the screw (such as adhesion), and the same is applied to other screwed portions described later.

The lens holding member 102 holds an X drive magnet 106x and a Y drive magnet 106y at positions that are different in phase by 90° from each other. Each of the X drive magnet 106x and the Y drive magnet 106y has two magnets. The lens holding member 102 holds an X yoke 107x and a Y yoke 107y corresponding to the X drive magnet 106x and the Y drive magnet 106y, respectively.

On the other hand, the fixed member 101 holds an X drive coil 108x and a Y drive coil 108y at positions facing the X drive magnet 106x and the Y drive magnet 106y, respectively. Since the drive coils (108x, 108y) are located in the magnetic field created by the drive magnets (106x, 106y) and the yokes (107x, 107y), a driving force in the shift direction is applied to the drive magnet by energizing the drive coil. Thereby, the lens holding member 102 holding the drive magnet and the yoke is driven in the shift direction.

The X drive magnet 106x, the X yoke 107x, and the X drive coil 108x constitute an X shift actuator (move actuator), and the Y drive magnet 106y, the Y yoke 107y, and the Y drive coil 108y constitute a Y shift actuator.

The lens holding member 102 holds an X-position detecting magnet 109x and a Y-position detecting magnet 109y for detecting a shift position of the lens holding member 102 in the X and Y directions at positions that are different in phase by 90° from each other. The cover 105 holds an X-position sensor 110x and a Y-position sensor 110y at positions opposite to the X-position detecting magnet 109x and the Y-position detecting magnet 109y, respectively. The position of the lens holding member 102 can be controlled with the shift position of the lens holding member 102 detected by the X-position sensor 110x and the Y-position sensor 110y.

Next follows a description of a supportive structure of the lens holding member 102. First guide members 111 having V-shaped groove portions 111a at two locations screwed onto the surface of the lens holding member 102 on a side opposite to the fixed member 101 (on the side of the cover 105). The V-shaped groove portion 111a is exposed on the side of the fixed member 101 through an opening formed in the lens holding member 102.

The second guide member 112 is disposed at a position opposite to the lens holding member 102 in the optical axis direction. The second guide member 112 has V-shaped groove portions 112a at two locations opposite to the V-shaped groove portions 111a of the first guide member 111. The V-shaped groove portion 111a and the V-shaped groove portion 112a have the longitudinal direction in the same X direction, and hold a rolling member (ball) 114a between them in the optical axis direction. The fixed member 101 and the lens holding member 102 have planar portions opposite to each other, and the rolling member 114b is sandwiched between the planar portions in the optical axis direction.

The lens holding member 102 is stably supported in the XY plane orthogonal to the optical axis direction by three rolling members 114a and 114b together with the first guide member 111. The lens holding member 102 is restricted from rotating relative to the second guide member 112 by the V-shaped groove portions 111a and 112a of the first and second guide members 111 and 112 and the rolling members 114a. On the other hand, it is guided in the X direction.

The third guide members 113A and 113B disposed on a side opposite to the first guide member 111 with respect to the second guide member 112 in the optical axis direction are fixed onto the fixed member 101 by screws. The third guide members 113A and 113B have a two-body structure divided into two in an XY plane orthogonal to the optical axis direction. The third guide members 113A and 113B are also generally referred as third guide members 113 hereinafter.

Each third guide member (113A, 113B) has one V-shaped groove 113b that has a longitudinal direction in the Y direction orthogonal to the X direction, which is the longitudinal direction of the V-shaped groove 111a. A V-shaped groove 112b that has a longitudinal direction in the Y direction similar to the V-shaped groove portion 113b is provided at the position opposite to the V-shaped groove portion 113b on a surface of the second guide member 112 opposite to the surface on which the V-shaped groove portion 112a having a longitudinal direction in the X direction is provided. The V-shaped grooves 112b and 113b sandwich the rolling member 114c in the optical axis direction. Further, planar portions are formed at opposite positions of the fixed member 101 and the second guide member 112, and these planar portions sandwich the rolling member 114d in the optical axis direction.

The second guide member 112 is stably supported in the XY plane orthogonal to the optical axis direction by the three rolling members 114c and 114d. The second guide member 112 is restricted from rotating relative to the fixed member 101 and guided in the Y direction relative to the fixed member 101 by the V-shaped groove portions 112b and 113b of the second and third guide members 112 and 113 and the rolling members 114c.

The first, second, and third guide members 111, 112, and 113 are placed at positions that do not overlap the drive magnets 106x and 106y, the yokes 107x and 107y, and the drive coils 108x and 108y (and a magnetic shield member described later) in the optical axis.

In the above configuration, when the X drive coil 108x is electrified, the lens holding member 102 is moved in the X direction together with the first guide member 111 relative to the second guide member 112, the third guide members 113A and 113B, and the fixed member 101. When the Y drive coil 108y is electrified, the lens holding member 102 is driven in the Y direction together with the first guide member 111 and the second guide member 112 relative to the third guide members 113A and 113B and the fixed member 101. In driving in these shift directions, the lens holding member 102 is restricted from rotating relative to the fixed member 101. In other words, the first, second, and third guide members 111, 112, and 113 and the rolling members 114a and 114c form a rotation restricting structure of the lens holding member 102.

Figure 4:
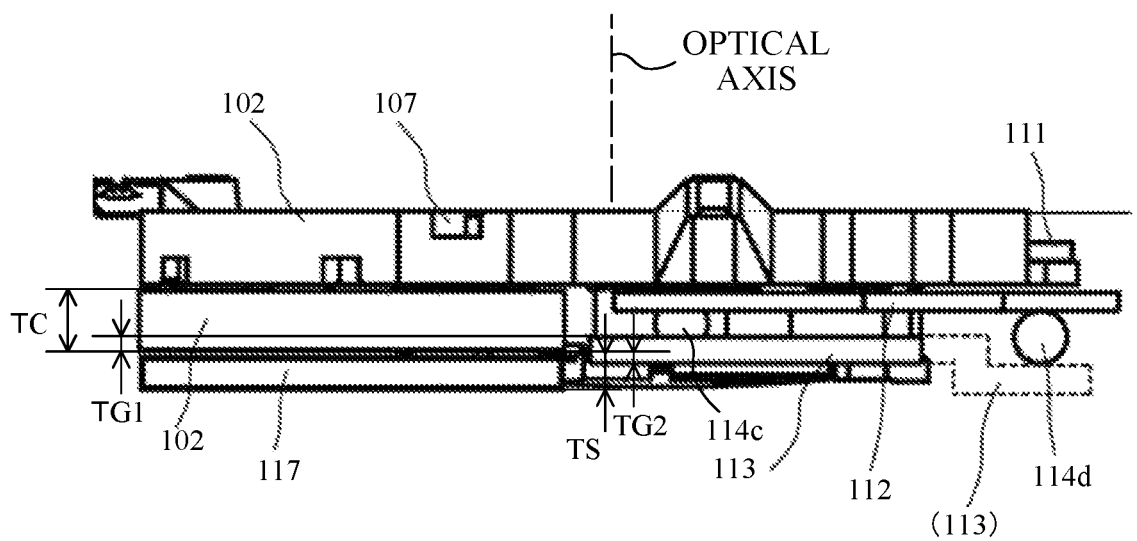
FIG. 4 is a side view illustrating principal components of the image stabilization unit according to this embodiment.

FIG. 4 illustrates the drive magnet 106, the yoke 107, the drive coil 108, the first guide member 111, the second guide member 112, the third guide member 113, and the rolling members 114c and 114d in the above image stabilization unit viewed from a direction orthogonal to the optical axis direction. FIG. 4 omits reference symbols x, y, A, and B illustrated in FIGS. 1 to 3.

As described above, the third guide member 113 has two bodies (113A and 113B). The two-body structure of the third guide member 113 can make compact the image stabilization unit. The reason will be described later.

As illustrated in FIG. 4, the first guide member 111 held by the lens holding member 102 is located closer to the second guide member 112 than the yoke 107 also held by the lens holding member 102 in the optical axis direction. Thereby, the rolling member 114a can use the same member having the same diameter as the rolling member 114c. The thickness of the second guide member 112 is thinner than the drive magnet 106 in the optical axis direction. Thereby, the image stabilization unit can be thinner in the optical axis direction.

As illustrated in FIG. 4, thickness TG1 of at least part of the third guide member 113 is included in the thickness TC of the drive coil 108 in the optical axis direction. This configuration can further reduce the thickness of the image stabilization unit in the optical axis direction. The entire thickness of the third guide member 113 may be included in the thickness of the drive coil 108.

When at least part of the first guide member 111, the second guide member 112, and the third guide member 113 may be housed in the thickness from the yoke 107 to the drive coil 108 in the optical axis direction, the thickness of the image stabilization unit can be further reduced.

Although not illustrated in FIGS. 1 to 3, FIG. 4 disposes a magnetic shield member 117 on a side opposite to the drive magnet 106 with respect to the drive coil 108. The magnetic shield member 117 blocks or reduces magnetism generated by electrifying the coil 108, and reduces the influence of magnetism on other components, such as an image sensor of a camera. Even in this case, the thickness TG2 of at least part of the third guide member 113 is included in the thickness TS of the magnetic shield member 117 in the optical axis direction. Thereby, the image stabilization unit can be made thinner.

The image stabilization unit can be made thinner by the structure that houses all of the first guide member 111, the second guide member 112, and the third guide member 113 within the thickness from the yoke 107 to the magnetic shield member 117 in the optical axis direction.

Figure 5:
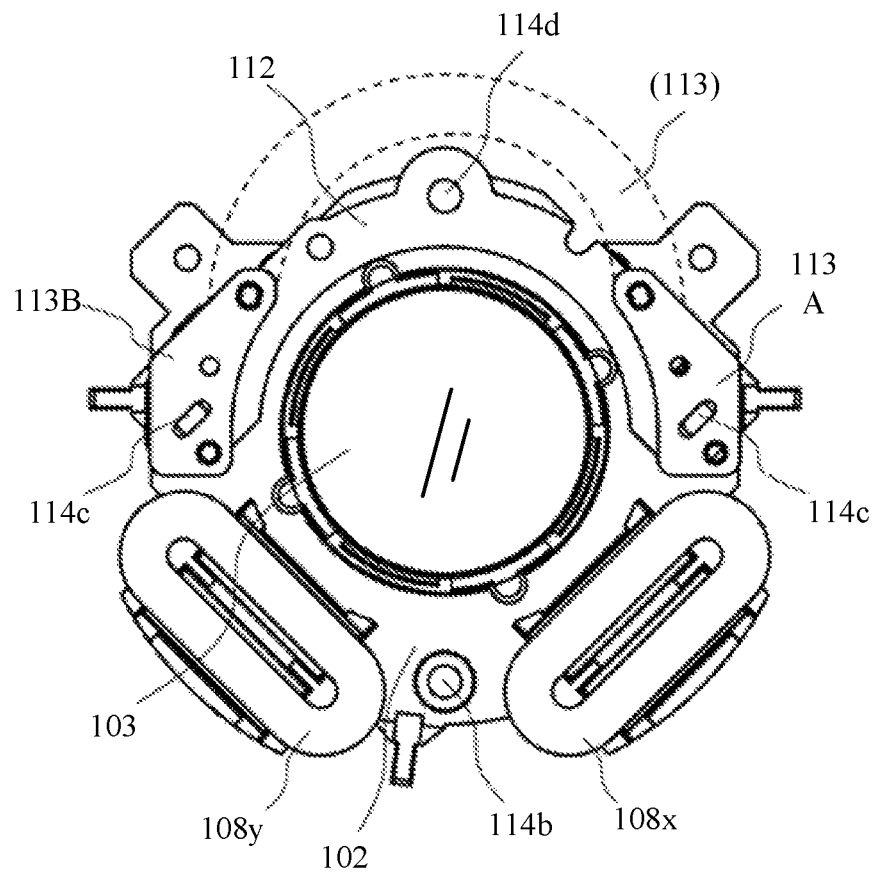
FIG. 5 is a rear view illustrating the principal components of the image stabilization unit according to this embodiment.

Next follows a description of the reason why the use of the two-body structured third guide members 113A and 113B can make compact the image stabilization unit. FIG. 5 illustrates the lens holding member 102, the drive coils 108x and 108y, the second holding member 112, the third holding members 113A and 113B, and the rolling members 114b, 114c, and 114d in the image stabilizing unit viewed from the optical axis direction.

As illustrated by a broken line in the figure, if the third guide member 113 is formed as a single body, it is necessary for the third guide member 113 to pass the outside of the rolling member 114d that contacts the planar portion of the second guide member 112 (and the fixing member 111). Then, the image stabilization unit becomes larger in a direction (radial direction) orthogonal to the optical axis direction.

As illustrated by the broken line in FIG. 4, a planar portion may be provided to the third guide member 113 instead of the planar portion of the fixed member 101, and the rolling member 114d may be sandwiched by this planar portion and the planar portion of the second guide member 112. However, in this case, it is necessary to form a planar portion by providing a step to the third guide member 113 so as to be separated from the planar portion of the second guide member 112 by the diameter of the rolling member 114d.

Since this embodiment sandwiches the rolling member 114c between the V-shaped grooves 112b and 113b of the second guide member 112 and the third guide member 113, an interval between the second guide member 112 and the third guide member 113 in the optical axis direction is smaller than the diameter of the rolling member 114c. The rolling member 114d may be the same member as the rolling member 114c for assembly convenience of the image stabilization unit and the cost. Hence, when the rolling member 114d having the same diameter as that of the rolling member 114c is sandwiched between the planar portion of the second guide member 112 and the planar portion of the third guide member 113, it is necessary to provide the step to the third guide member 113 as illustrated by the broken line in FIG. 4. This step increases the thickness of the image stabilizing unit in the optical axis direction.

Since the third guide member is made of metal from the viewpoint of strength, the step illustrated in FIG. 4 makes working difficult but the two-body structure can solve this problem.

Although not illustrated, the integrally structured third guide member may overlap the drive coil in the optical axis direction, but this structure would obviously increase the thickness of the image stabilization unit.

From the above, the third guide members 113A and 113B having the two-body structure can make compact the image stabilization unit in both the optical axis direction and the radial direction. By disposing the compact image stabilization unit in the lens unit, the design freedom of the lens unit is increased and the lens unit can be made compact.

Figure 6:
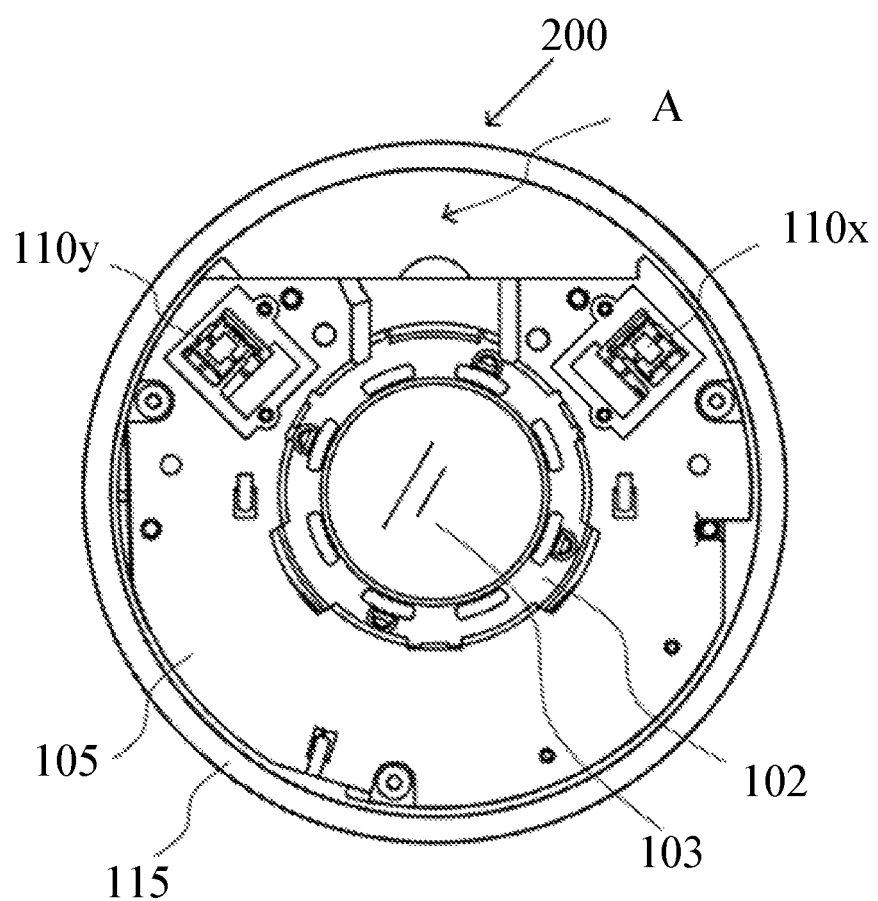
FIG. 6 is a front view of the image stabilization unit according to this embodiment.
Figure 7:
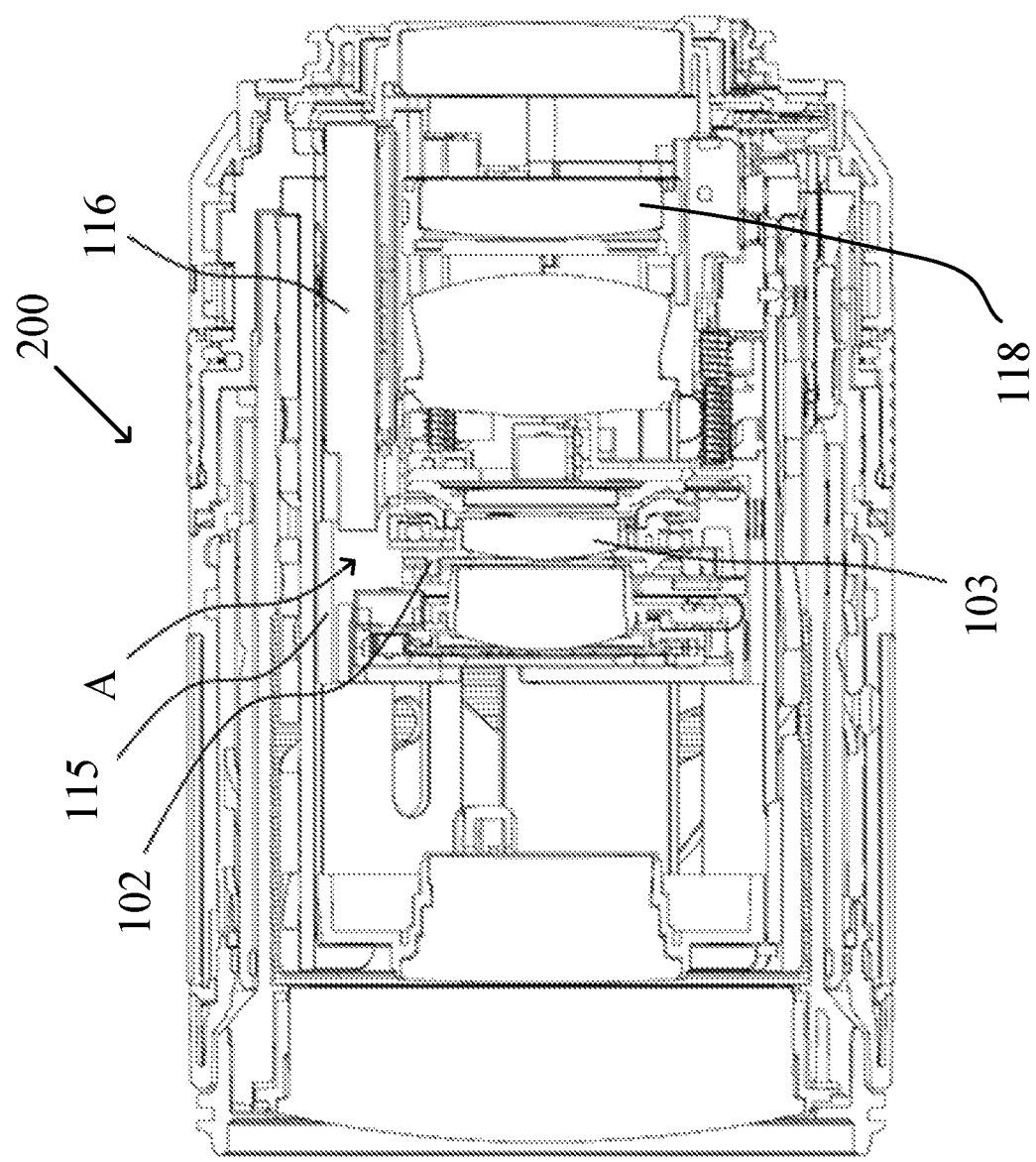
FIG. 7 is a sectional view of an interchangeable lens unit including the image stabilization unit according to this embodiment in a wide-angle (WIDE) state.
Figure 8:
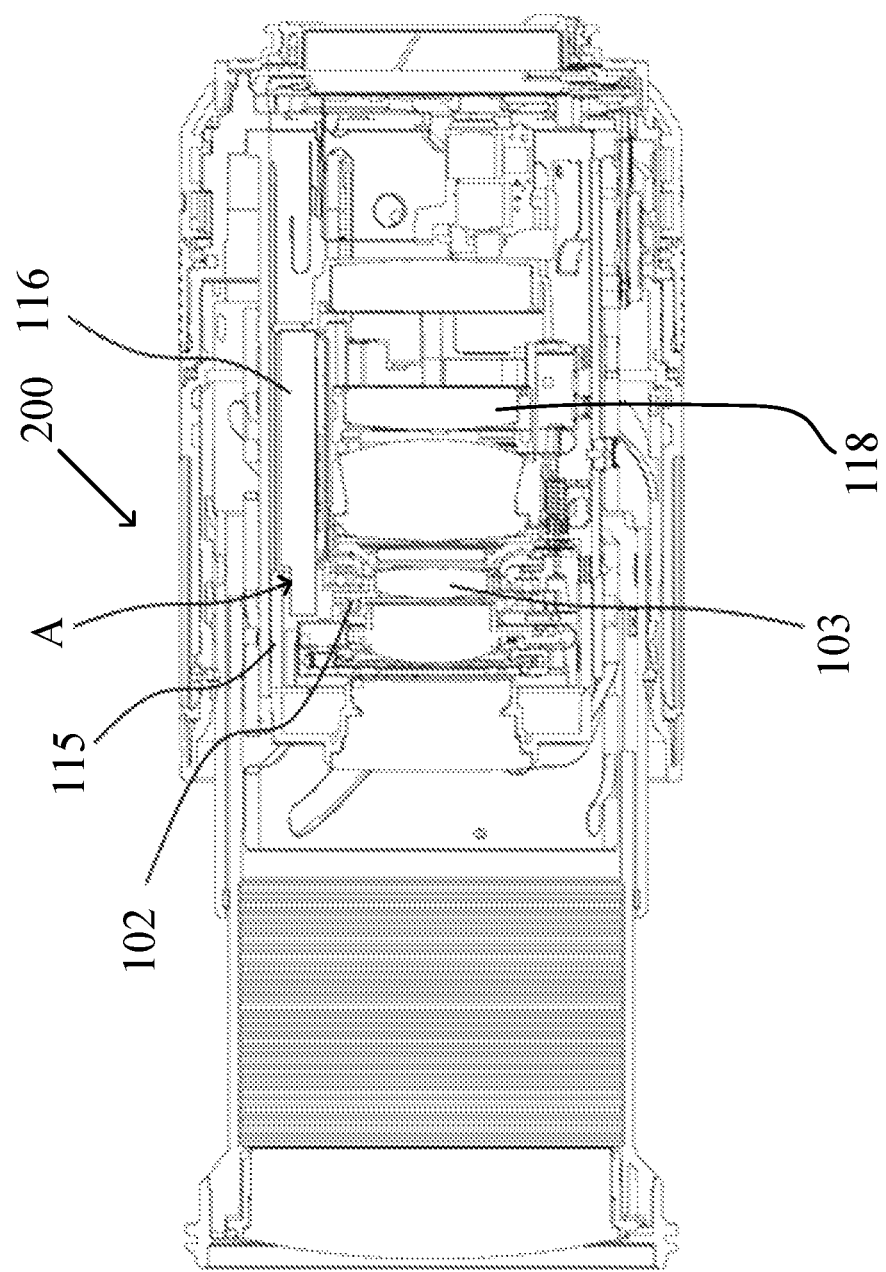
FIG. 8 is a sectional view of the interchangeable lens unit including the image stabilization unit according to this embodiment in a telephoto (TELE) state.

FIGS. 6, 7, and 8 illustrate an interchangeable lens unit 200 as an optical apparatus including the image stabilization unit according to this embodiment. FIG. 6 illustrates a section orthogonal to the optical axis direction of the interchangeable lens unit 200, and FIGS. 7 and 8 illustrate sections along the optical axis in the wide-angle (WIDE) state and the telephoto (TELE) state of the interchangeable lens unit, respectively.

As illustrated in FIG. 6, a space A is formed above the image stabilization unit in the interchangeable lens unit 200 or on the side opposite to the X and Y shift actuators described above with respect to the optical axis. The space A is a space between an inner wall of an inner cylinder 115 and a top of the image stabilization unit in the interchangeable lens unit 200, and formed by using third guide members 113A and 113B having the two-body structures.

As illustrated in FIGS. 7 and 8, a focus lens 118 as a movable lens for moving in the optical axis direction during focusing is disposed on the image side of the image stabilization unit in the interchangeable lens unit 200, and a focus lens actuator 116 for moving the focus lens 118 in the optical axis direction is provided in the interchangeable lens unit 200. The focus lens actuator 116 is a linear actuator, a stepping motor, a voice coil motor, or the like.

The focus lens actuator 116 can enter the space A in the TELE state as illustrated in FIG. 8. In other words, the focus lens actuator 116 can be located in a region overlapping the image stabilization unit including the third guide members 113A and 113B having the two-body structures, in the direction orthogonal to the optical axis direction. In FIG. 8, the focus lens actuator 116 is disposed so as to overlap not only the third guide members 113A and 113B but also the lens holding member 102 in a direction orthogonal to the optical axis direction.

Thus, the space A is effectively used in the interchangeable lens unit 200. The focus lens actuator 116 may be disposed in the space A in the entire zoom state from the WIDE state to the TELE state in addition to the TELE state, or the focus lens actuator 116 may be disposed in the space only in the zoom state other than the TELE state.

For example, the focus lens actuator 116 may not enter the space A in the TELE state (first zoom state), but may enter the space A in the WIDE state (second zoom state). Thereby, the correction lens 103 that requires a large shift amount in the TELE state can be controlled so that its shift amount in the TELE state can be larger than that in the WIDE state.

Thereby, the interchangeable lens unit can be made compact while a good image stabilizing effect is secured in all zoom states.

While this embodiment has discussed the interchangeable lens unit as the optical apparatus, an image pickup apparatus with which the lens unit is integrated is also included in the embodiment of the present invention.

While this embodiment has discussed the shiftable correction lens as the optical element, a shiftable image sensor as another optical element is also included in the embodiment of the present invention.

While this embodiment has discussed the optical image stabilization apparatus for correcting the image blurs, the present invention is not limited to the image stabilization and covers an optical element to be shifted for other applications.

The above embodiment can realize a compact optical move apparatus having a rotation restricting structure (first to third guide members) of the optical element and an optical apparatus having the same.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-092924, filed on May 16, 2019, which is hereby incorporated by reference herein in its entirety.

What is claimed is:

1. An optical move apparatus configured to move an optical element in a first direction and a second direction that are orthogonal to an optical axis direction and orthogonal to each other, the optical move apparatus comprising:
   a base member;
   a drive coil held by the base member;
   a holding member configured to hold the optical element and to move in the first and second directions;
   a drive magnet held by the holding member and serving as a move actuator configured to drive the holding member together with the drive coil in the first and second directions;
   a first guide member fixed to the holding member;
   a second guide member configured to guide the first guide member in the first direction; and
   a third guide member fixed to the base member and configured to guide the second guide member in the second direction on a side opposite to the first guide member in the optical axis direction,
   wherein none of the first, second, and third guide members overlap the drive coil in the optical axis direction,
   wherein the third guide member includes two bodies in a plane orthogonal to the optical axis direction, and
   wherein at least part of the third guide member is thinner than the drive coil in the optical axis direction.

2. The optical move apparatus according to claim 1, wherein a yoke is disposed on a side opposite to the drive coil with respect to the drive magnet in the optical axis direction, and
   wherein the first and second guide members and at least part of the third guide member are housed within a thickness from the yoke to the drive coil in the optical axis direction.

3. The optical move apparatus according to claim 2, wherein the first guide member is disposed closer to the second guide member than the yoke in the optical axis direction.

4. The optical move apparatus according to claim 1, further comprising a magnetic shield member disposed on a side opposite to the drive magnet with respect to the drive coil in the optical axis direction,
   wherein at least part of the third guide member is thinner than the magnetic shield member in the optical axis direction.

5. The optical move apparatus according to claim 4, wherein a yoke is disposed on a side opposite to the drive coil with respect to the drive magnet in the optical axis direction, and
   wherein the first, second, and third guide members are housed within a thickness from the yoke to the magnetic shield member in the optical axis direction.

6. The optical move apparatus according to claim 1, wherein the second guide member is thinner than the drive magnet in the optical axis direction.

7. The optical move apparatus according to claim 1, wherein the first and second guide members have longitudinal directions in the first direction and groove portions opposite to each other,
   wherein the second and third guide members have longitudinal directions in the first direction and groove portions opposite to each other, and
   wherein the groove portions opposite to each other sandwich a rolling member for guidance in the first and second directions.

8. An optical move apparatus configured to move an optical element in a first direction and a second direction that are orthogonal to an optical axis direction and orthogonal to each other so as to reduce an image blur, the optical move apparatus comprising:
   a base member;
   a drive coil held by the base member;
   a holding member configured to hold the optical element and to move in the first and second directions;
   a drive magnet held by the holding member and serving as a move actuator configured to drive the holding member together with the drive coil in the first and second directions;
   a first guide member fixed to the holding member;
   a second guide member configured to guide the first guide member in the first direction; and
   a third guide member fixed to the base member and configured to guide the second guide member in the second direction on a side opposite to the first guide member in the optical axis direction; and
   a magnetic shield member disposed on a side opposite to the drive magnet with respect to the drive coil in the optical axis direction,
   wherein none of the first, second, and third guide members overlap the drive coil or the magnetic shield member in the optical axis direction,
   wherein the third guide member includes two bodies in a plane orthogonal to the optical axis direction, and
   wherein the thickness of at least part of the third guide member is thinner than the magnetic shield member in the optical axis direction.

9. An optical apparatus comprising an optical move apparatus configured to move an optical element in a first direction and a second direction that are orthogonal to an optical axis direction and orthogonal to each other,
   wherein the optical move apparatus includes:
   a base member;
   a drive coil held by the base member;
   a holding member configured to hold the optical element and to move in the first and second directions;

a drive magnet held by the holding member and serving as a move actuator configured to drive the holding member together with the drive coil in the first and second directions;

a first guide member fixed to the holding member;

a second guide member configured to guide the first guide member in the first direction; and a third guide member fixed to the base member and configured to guide the second guide member in the second direction on a side opposite to the first guide member in the optical axis direction, wherein none of the first, second, and third guide members overlap the drive coil in the optical axis direction, wherein the third guide member includes two bodies in a plane orthogonal to the optical axis direction, and wherein at least part of the third guide member is thinner than the drive coil in the optical axis direction.

10. The optical apparatus comprising according to claim 9, further comprising:

a movable lens movable in the optical axis direction; and a lens actuator configured to drive the movable lens, wherein the lens actuator is disposed so as to overlap the optical move apparatus in a direction orthogonal to the optical axis direction.

11. The optical apparatus according to claim 10, wherein the lens actuator is disposed on a side opposite to the move actuator with respect to an optical axis of the optical apparatus.

12. The optical apparatus according to claim 10, wherein the optical apparatus is configured zoomable, and has a first zoom state in which the lens actuator does not overlap the optical move apparatus in a direction orthogonal to the optical axis direction.

13. The optical apparatus according to claim 12, wherein a move amount of the holding member in the first zoom state is larger than that in a second zoom state in which the lens actuator overlaps the optical move apparatus in a direction orthogonal to the optical axis direction.

* * * * *